Oct. 26, 1971  D. G. PEDROTTI ET AL  3,615,138

DICHROIC MIRROR ALIGNMENT SYSTEM

Filed Oct. 31, 1969  2 Sheets-Sheet 2

INVENTORS
DONALD G. PEDROTTI
RAINER REIMANN
BY
*Harry R. Lubcke*
AGENT

United States Patent Office 3,615,138
Patented Oct. 26, 1971

3,615,138
DICHROIC MIRROR ALIGNMENT SYSTEM
Donald G. Pedrotti, Cupertino, and Rainer Reimann, Saratoga, Calif., assignors to Hugle Industries Inc., Sunnyvale, Calif.
Filed Oct. 31, 1969, Ser. No. 872,976
Int. Cl. G01b *11/27;* G02b *5/28*
U.S. Cl. 356—153
6 Claims

ABSTRACT OF THE DISCLOSURE

An optical system for observing manipulation of two objects to be related in a predetermined manner; i.e., a microscope and a dichroic mirror to provide superimposed images of a flip-chip and of a substrate, which are to be bonded together after a desired positional relation between patterns for electrical connections on both are established. The optical axis of the microscope intersects the dichroic mirror such that a reflected image of the flip-chip and a transmitted image of the substrate are formed for viewing. Each have a distinctive color, aiding in the manipulation.

BACKGROUND OF THE INVENTION

This invention pertains to an optical system having a dichroic or equivalent reflective-transmissive element for forming plural images of different colors.

The prior art has used a split optical system for obtaining images of the flip-chip and the substrate while these two are 90° apart, and then swinging the flip-chip downward through a 90° arc to accomplish bonding of the flip-chip to the substrate.

Half-silvered mirrors have also been used with the elements to be joined in closer relation. No effort to obtain chromatic identity for the images of the objects to be joined was made. Others have combined this optical system with a transmissive color filter, but this combination is known to be opticaly inefficient.

SUMMARY OF THE INVENTION

The optical axis of a microscope is oriented either vertically or at an angle to view the substrate. A dichroic mirror is interposed in the path of the optical axis such that a reflection from the mirror optically intersects the flip-chip. The latter is held directly above the substrate and only the simple mechanical motion of downward translation is required to bring the flip-chip and the substrate into contact.

Contrasting colors for the two images are obtained, with discrimination from the usual "white" ambient light.

An efficient optical system being based on frequency division of the available light spectrum, and simple translational mechanical movement of the flip-chip to the substrate, are other features.

DESCRIPTION OF THE PREFERRED EMBODIMENTS

Figure 1:
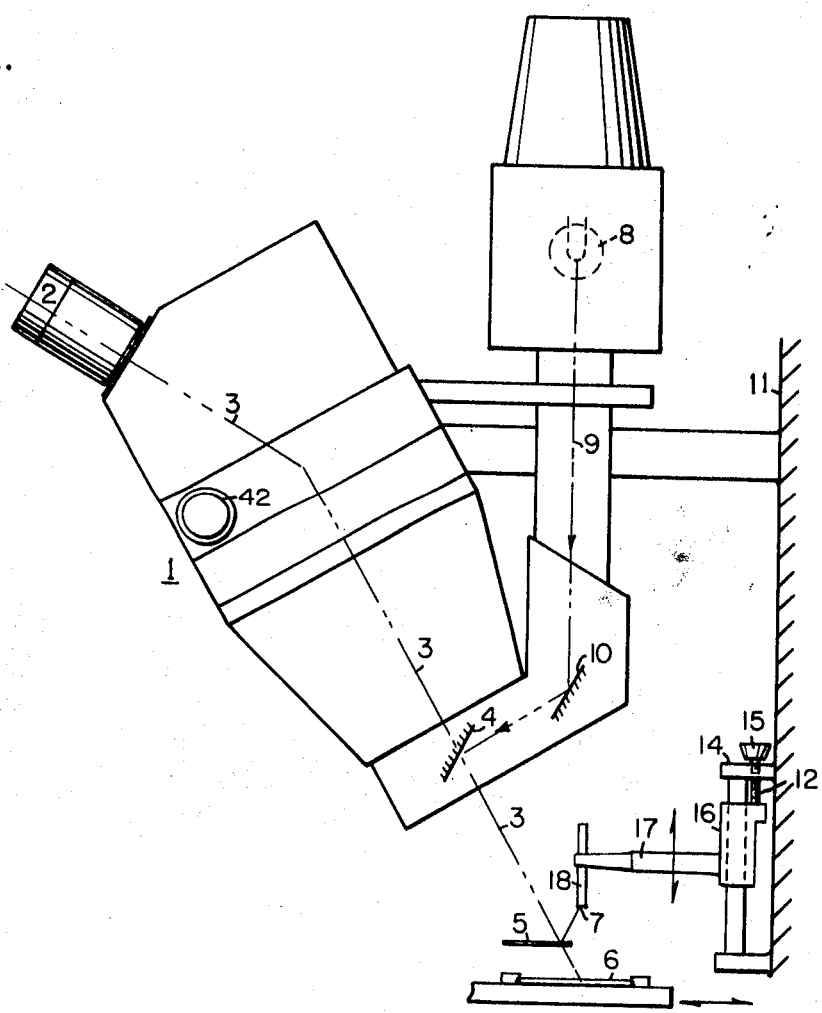
FIG. 1 is a side elevation of an inclined optical system embodiment and the related apparatus elements of this invention.
Figure 2:
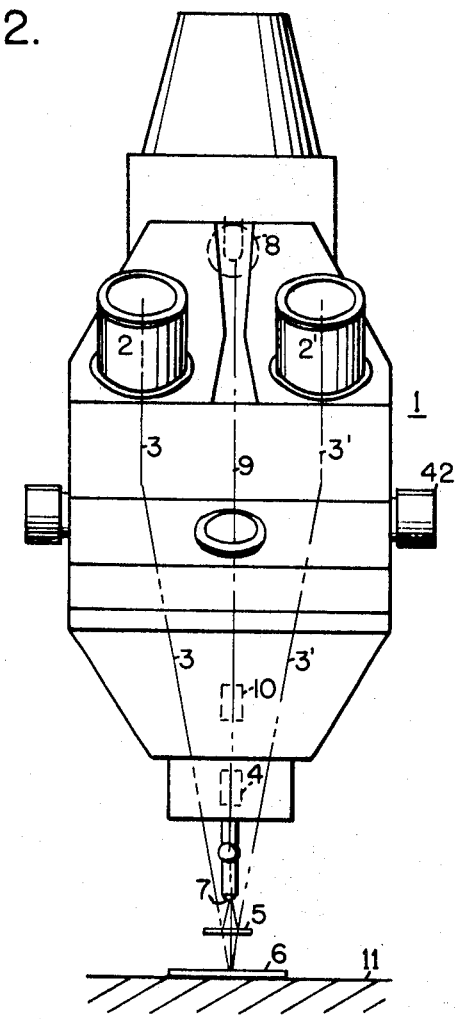
FIG. 2 is a front elevation of the same, showing the binocular aspect of the typical microscope.

In FIGS. 1 and 2 numeral 1 generally identifies a stereoscopic microscope, such as is known in the art and as manufactured by the American Optical Co. and others. This entity need not be stereoscopic and need only present an image to an eye. However, the stereoscopic microscope is best suited to observe manipulation of solid state elements that are to be suitably relatively positioned for bonding, one to the other. From each eyepiece 2 and 2' and concentric therewith, an optical axis 3, 3' passes through duplicate microscope elements (which have not been shown), through dichroic mirror 5, by transmission therethrough to solid state substrate 6, and by reflection from the mirror to solid state flip-chip 7, in a typical application. Actually, the light provided to the eyes for viewing traverses the optical path in the direction opposite to this recitation.

High intensity incandescent lamp 8 provides controllable illumination upon the work. Suitably collimated by means not shown this light passes down axis 9, is reflected by mirror 10 and again by mirror 4, so as to be centrally disposed and approximately parallel to the viewing axes 3 and 3'.

Figure 3:
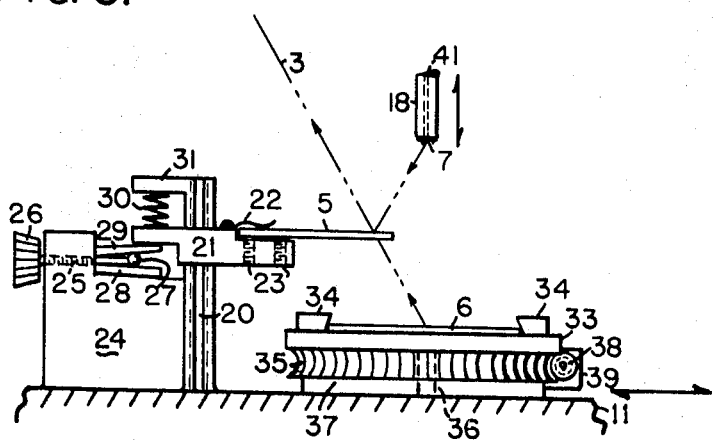
FIG. 3 is an enlarged fragmentary view of the inclined optical system of FIG. 1, showing the optics and the manipulative adjustments.

This microscope assembly is attached to base 11, which is common with base 11 of FIG. 3. This base is not shown in detail, since it is not significant in the invention.

The principal object of the optical system in this art is to provide superimposed images of electric terminal "bumps" upon chip 7 of corresponding conductive areas upon substrate 6. To accomplish this the optical path from the top (coated) of dichroic mirror 5 to chip 7 must be equal in length to that from the top of the mirror to substrate 6. Accordingly, an at "home" stop 12 is provided. This is adjustable within bracket 14 of the base by turning knob 15. This limits the upward travel of sleeve bearing 16, hence transducer arm 17, tool 18 and consequently chip 7. In one known mode of bonding the transducer arm is capable of producing ultrasonic vibrations when electrically energized to accomplish welding of the bumps on chip 7 to the corresponding areas upon substrate 6. Further details on this type of structure and processing are to be found in our copending application, "Pneumatic Force-Exerting System," Ser. No. 808,416, filed Mar. 19, 1969, wherein by pneumatic means the equivalent of elements 12 and 15 are provided.

An additional adjustment for providing transmitted and reflected optical paths of equal length is arranged in the mounting of dichroic mirror 5, as shown in FIG. 3. Suitable support means, such as the dovetail slot upright 20, provides a precise vertically adjustable support for mirror holder 21. Mirror 5 is held to the holder by leaf spring 22. A pair of set screws 23, passing from the support to the under side of the mirror, make possible alignment of the mirror so that it will be in a (horizontal) plane parallel to that of substrate 6.

Fine adjustment of the position of the mirror is accomplished by the structure atop base pedestal 24. Threaded screw 25 is horizontally contained within internal threads in the pedestal. Rotation of knob 26, attached to screw 25, causes wedge-operator ball 27 to translate. Motion thereof to the left in FIG. 3 separates wedges 28 and 29, with the result that wedge 29 raises mirror holder 21 incrementally. This motion is resisted by compression spring 30, which is held between base bracket 31 and the top of holder 21. In use, adjustment is made by raising holder 21, thereby assuring that there is no play in the mechanism.

In order that substrate 6 be oriented to align the conductive areas thereon with the bumps on chip 7; or to secure any other alignment between elements 6 and 7 for any purpose, orienting structure is provided below substrate holder 33. Suitable clamp means 34 are provided atop holder 33 to secure substrate 6 thereon. Alternately, pneumatic clamp means of equivalent structure may be employed.

Large worm gear 35 is attached to holder 33 immediately below the same. The gear is mounted on shaft 36, which is journaled in translation plate 37. Worm 38 is journaled in bracket 39 and engages worm gear 35. Rotation of the worm gives incremental rotation of the gear and consequent rotation of substrate 6. In a known manner, translation plate 37 is provided with translational adjustments in two directions (typically at right angles). This may be screw rods and journals at right angles with an additional plate, or merely a grease plate support between plate 37 and base 11. A motion-reducing pantograph (not shown) may be included to provide easy incremental positional adjustment.

While various spectral charateristics may be employed for the dichroic element, measurements on a suitable dichroic coating have shown 80% transmissibility in the spectral range from 400 to 560 nano-meters (nm.), 10% transmissibility from 580 to 610 nm., and 99% reflectivity from 630 to 700 mm. One nano-meter=one millimicron=$1 \times 10^{-9}$ meter.

The dichroic coating is applied to the top of a thin piece of glass having plane and parallel surfaces, such as a microscope slide. A suitable size is approximately ½ by 1 by 0.035 inch. The dichroic coating is available as a commercial process. Of course, other dichroic-functioning material may be used, such as certain crystals.

What is accomplished in the present invention is that light transmitted through the dichroic mirror appears to the observer as blue, while the reflected light appears red. This gives any pattern on the substrate as blue and any pattern on the flip-chip as red. In certain instances the bumps upon chip 7 may appear gold in color, depending upon the metal utilized for the same, as aluminum or possibly silver. This trend from red toward the yellow is innocuous, since chromic contrast is retained.

It has been found that with the chromatic contrast provided by this invention alignment is much easier than when using a half-silvered mirror for element 5, particularly for the situation where aluminum is used for the bumps and also for the circuitry.

In operation, a chip 7 is retained upon the lower end of tool 18, as by a vacuum maintained through central hole 41 in the tool by known means that have not been shown. Substrate 6 is positioned on holder 33 and clamp 34 put in place. With bulb 8 giving illumination, the operator looks through eyepieces 2, 2'. Assuming proper focus, which may be obtained by rotating knob 42, the bumps on the chip will be seen in red color and the conductive areas on the substrate will be seen in blue color. With this contrast it is easy to manipulate the substrate mechanically by rotation and translation to obtain coincidence between the bumps and the areas.

Having achieved this optical coincidence, a subsequent desired operation, such as bonding the flip-chip to the substrate, is forwarded by translating the chip directly downward. Pneumatic or other means may be employed upon sleeve 16 to accomplish this. When the elements to be joined are in contact transducer arm 17 may be energized to accomplish ultrasonic bonding, or thermo-compression instrumentalities may be employed to accomplish bonding. Other processes may alternately or successively be accomplished subsequent to the alignment brought about by the optical alignment process of this invention. In any event, the elements that have been operated upon are removed and the process repeated as necessary. Frequently, a number of flip-chips are bonded to one substrate and successive chips are handled by breaking the vacuum normally held in central hole 41 after one has been bonded and picking up another by reestablishing the vacuum in known ways.

In FIG. 2 the alignment system device of this invention is seen in front elevation, showing how the two optical axes 3 and 3' converge at both substrate 6 and chip 7 to give stereoscopic viewing. Such viewing is desirable but is not required for the functioning of this invention. Monocular viewing suffices.

In FIGS. 1 through 3 a microscope having optical axes 3, 3' that are inclined to the vertical have been employed. This inclination may be of the order of 30°. It is equally possible; however, to employ the dichroic method and apparatus with a vertically disposed optical system, as indicated in essence in FIG. 4. The chromatic separation between transmission through and reflection from a dichroic mirror is essentially unaffected by the angle of incidence of the light rays. Since certain microscopes commercially available employ vertically oriented axes 3", 3"' as seen in the side elevation showing according to FIG. 1 these may be substituted for the inclined axes type previously discussed.

Figure 4:
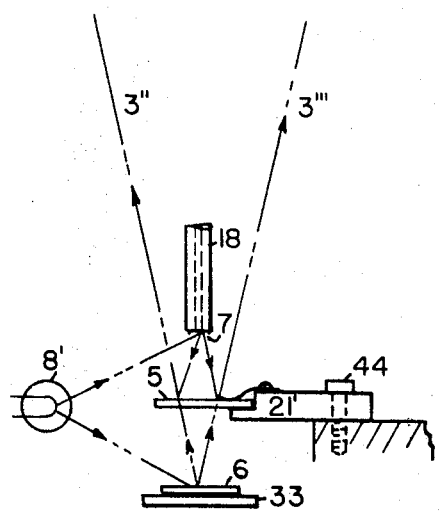
FIG. 4 is a similar fragmentary front elevation of a vertical optical system embodiment of the invention.

With the optical structure of FIG. 4 it is evident that dichroic mirror 5 must be removed from the subsequent downward path of flip-chip 7 for accomplishing its union with substrate 6. This is accomplished by hinging holder 21' to base 11 by precision stud 44, which passes through a hole in the end of the holder away from mirror 5 and screws into base 11. This removal is accomplished either manually, or by pneumatic or electric means. Suitable interlocks, either in the form of a mechanical projection preventing the decent of chip 7 for the manual embodiment, or of pneumatic or electric nature for the other means mentioned, may be arranged to prevent lowering tool 18 and chip 7 while dichroic mirror 5 is in the position for optical processing, as shown in FIG. 4. With the stud, removal is accomplished by rotating the mirror out of the way, but other mechanisms to translate it out of the way may be substituted.

Although the embodiment of FIG. 4 requires moving an element of the alignment system between processing successive flip-chips, it is seen that only an optical element is moved and the manipulative step itself requires only rectilinear translation of the flip-chip. This mode of operation is believed to be simpler and more conductive to prolonged accuracy than other modes, such as a wide 90° arcuate motion of the flip-chip according to prior art.

Various sizes and proportions for the elements may be employed in practicing this invention; however, a typical vertical distance between the top of dichroic mirror 5 and the surface of the bumps on chip 7 is one-half inch, and between the top of the mirror and the conductive areas on substrate 6 is also one-half inch. Typically the bumps extend downward from the chip a distance of 0.0005 to 0.004 inch and the conductive areas extend upward a few thousandths of an inch from the general surface of the substrate. The conductive areas take patterns depending upon the electrical nature of the particular chip and substrate involved. These patterns are made coincident prior to bonding. When the apparatus of this invention is used for manufacturing many substantially identical chips and substrates the adjustment required for coincidence may be only incremental from one to the next. However, the apparatus is suited for processing any configuration of patterns on an individual basis.

In FIGS. 1 and 2 the illumination has been shown to come from light source 8 in a path approximately the same as the viewing path (9 and 3, 3'). It is only necessary that the surface of chip 7 and of substrate 6 be illuminated by a light source that that has a spectrum embracing much of the visual range of frequencies. Accordingly, a source 8' positioned adjacent to and at one side of the surfaces may be used, as shown in FIG. 4. It is the transmission through dichroic mirror 5 and the reflection therefrom of the light employed for viewing that gives the desired chromatic differentiation.

The term "path" includes one or a pair of axes, as 3, 3', and the space adjacent thereto in which light flux forming an image or a pair of related images is to be found.

We claim:

1. An optical alignment system comprising;

(a) optical image-forming means having an optical path (3, 3'),
(b) a dichroic mirror (5) positioned to intersect said optical path,
(c) a first illuminated surface (6) lying in a plane parallel to and below said dichroic mirror, whereby illumination from said first surface is transmitted through said dichroic mirror along said optical path, and
(d) a second illuminated surface (7) lying in another plane parallel to and above said dichroic mirror, whereby illumination from said second surface is reflected by said dichroic mirror along said optical path.

2. The optical system of claim 1, in which;
(a) the distance between said dichroic mirror and said first illuminated surface is equal to the distance between said dichroic mirror and said second illuminated surface.

3. The optical system of claim 1, which additionally includes;
(a) adjustment means (25, 26, 27, 28, 29) for moving said dichroic mirror between said first surface and said second surface while maintaining parallelism thereto, to position the dichroic surface of said dichroic mirror equidistantly from said first and second surfaces.

4. The optical system of claim 1, in which;
(a) said dichroic mirror (5) is positioned to intersect said optical path (3, 3') at an angle.

5. The optical system of claim 1, in which;
(a) said optical path is comprised of two optical axes (3 and 3'), each having the same point of origin and mutually diverging to provide stereoscopic viewing for the eyes.

6. The optical system of claim 1, which additionally includes;
(a) hinge means (44) for moving said dichroic mirror (5) away from said optical path sufficiently far to allow said first and second surfaces to be brought together.

References Cited
UNITED STATES PATENTS

| | | |
|---|---|---|
| 2,423,370 | 7/1947 | Butscher. |
| 2,427,256 | 9/1947 | Butscher. |
| 3,318,185 | 5/1967 | Kott. |

FOREIGN PATENTS

| | | |
|---|---|---|
| 943,242 | 1963 | Great Britain. |

RONALD L. WIBERT, Examiner

J. ROTHENBERG, Assistant Examiner

U.S. Cl. U.S.

350—81, 166; 356—156